United States Patent [19]

Hwang et al.

[11] Patent Number: 4,561,421
[45] Date of Patent: Dec. 31, 1985

[54] HIGH EFFICIENCY FURNACE

[75] Inventors: Kyu S. Hwang, St. Claire Beach; Dennis J. Koestler, Leamington, both of Canada

[73] Assignee: Duo-Matic/Olsen Inc., Ontario, Canada

[21] Appl. No.: 697,282

[22] Filed: Feb. 1, 1985

Related U.S. Application Data

[62] Division of Ser. No. 562,437, Dec. 16, 1983, Pat. No. 4,537,178.

[51] Int. Cl.[4] .......................... F24H 3/02; F24D 5/00
[52] U.S. Cl. ................................. 126/110 R; 237/50; 237/55; 126/99 D
[58] Field of Search ........................ 126/110 R, 99 D; 237/50, 55; 122/17, 13 R

[56] References Cited

U.S. PATENT DOCUMENTS

| | | | |
|---|---|---|---|
| 4,261,326 | 4/1981 | Ihlenfield | 126/110 R |
| 4,289,730 | 9/1981 | Tomlinson | 126/110 R |
| 4,401,058 | 8/1983 | Charrier et al. | 122/17 |
| 4,480,590 | 11/1984 | Rhodin | 122/13 R |

Primary Examiner—Henry C. Yuen
Attorney, Agent, or Firm—Darby & Darby

[57] ABSTRACT

Disclosed is a dwelling furnace having at least one clam-shell type primary heat exchanger in parallel orientation with a secondary heat exchanger, both the primary and secondary heat exchangers being vertically oriented relative to a furnace housing and parallel to the flow of air to be heated. The primary heat exchanger has a combustion chamber in the lower end thereof, and the lower end of the secondary heat exchanger exhausts into a tertiary heat exchanger oriented approximately perpendicular to the primary and secondary heat exchangers and horizontally relative to the housing, below the combustion chambers of the primary heat exchangers and below the exhaust outlet of the secondary heat exchanger. The tertiary heat exchanger includes a plurality of condensation tubes for retrieving the latent heat of condensation of the combustion gases. The furnace further comprises an induced draft blower for drawing combustion gases through the heat exchangers and inducting sufficient air to the combustion chamber of the primary heat exchanger for efficient combustion.

1 Claim, 7 Drawing Figures

HIGH EFFICIENCY FURNACE

This is a division, of application Ser. No. 562,437, filed Dec. 16, 1983, U.S. Pat. No. 4,537,178.

FIELD OF THE INVENTION

This invention relates to a high efficiency furnace which reduces the amount of energy lost through exhaust into the flue system.

BACKGROUND OF THE INVENTION

Dwelling furnaces of the type that recirculate dwelling air to a central furnace to be heated all operate on the same general principle. Dwelling air to be heated circulates around a closed system which is heated by burning a fuel, generally home heating oil, natural gas, propane, butane or mixtures thereof. Since burning the fuel results in the production of noxious combustion gases, it is vital that these gases not be introduced to the dwelling, but rather be exhausted through a chimney or flue to the atmosphere. The most important problem in modern furnace design is the extraction of the maximum amount of heat from the burned fuel before exhausting the combustion gases to the atmosphere.

Early designs consisted primarily of a heat exchanger having combustion chambers longitudinally arranged in relation to the flow of dwelling air to be heated such that fuel is introduced at a lower end where a flame causes heat to be generated. The heat rises through a series of internal baffles before exiting through an upper end of the combustion chamber into the chimney system. Concomitantly, circulated dwelling air passes around the outside of the heat exchangers to absorb heat through conduction, convection and radiation. Heat passes through the combustion chamber wall in a primary heat exchanger system. The system is relatively inefficient and combustion gas temperatures at the outlet of the furnace can exceed 500° F.

In an attempt to capture more heat before the combustion gases are released to the atmosphere, more intricate baffling systems were implemented. However, the introduction of constricting baffles requires an induced draft blower to force the exhaust gases out of the furnace. An example of such design is disclosed in U.S. Pat. No. 4,261,326 to Ihlenfield, issued Apr. 14, 1981. Ihlenfield's design converted e.g., a three combustion chamber furnace into a two combustion chamber furnace having a secondary down-flow heat exchanger. Converting a combustion chamber (or primary heat exchanger) into a down-flow (or secondary heat exchanger) is effectuated by converting the air/fuel inlet of one primary heat exchanger into a exhaust outlet. At the same time, the two exhausts for the primary heat exchangers are placed in fluid communication with the now inlet end of the secondary heat exchanger. The induced draft blower placed beyond the secondary heat exchanger exhaust causes the combustion gases produced in the primary heat exchanger to be drawn through the top of the secondary heat exchanger downward through the secondary heat exchanger and out of the heat exchanger at the bottom (formerly the inlet) and exhausted by the induced draft blower into the flue system. Utilization of a secondary heat exchanger increases the efficiency to a claimed 85 to 87%. Nonetheless, exhaust temperatures for this type of furnace are in the vicinity of 200° F. or higher.

Another innovation in high efficiency dwelling furnace design is the advent of the condensing or tertiary heat exchanger. This type of heat exchanger extracts heat from the combustion gases by effecting a phase change from the gaseous to liquid state. The condensation is accomplished by having the relatively cool dwelling air contact the surfaces of the tertiary heat exchanger before it is heated by either the primary or secondary heat exchanger. An example of a furnace utilizing the tertiary heat exchanger is found in Canadian Pat. No. 1,108,499, of Schaus, et al, issued Sept. 8, 1981. However, the Schaus, et al. furnace utilizes an unorthodox design comprising drum type heat exchangers having a central combustion chamber, and a secondary heat exchanger surrounding the combustion chamber which then fluidly connects to a vertically oriented tertiary condensation heat exchanger.

OBJECTS OF THE INVENTION

It is an object of the present invention to provide an extremely high efficiency dwelling furnace utilizing a primary, secondary and tertiary heat exchanger with an induced draft blower system.

It is a further object of the present invention to provide a high efficiency dwelling furnace utilizing a conventional furnace housing using side-by-side heat exchangers, to provide an easily modified furnace to incorporate the secondary and tertiary heat exchanger and effect easy replacement and/or servicing of any or all of the heat exchangers.

It is yet another object of the present invention to provide a high efficiency dwelling furnace having a steady state efficiency of approximately 95%.

SUMMARY OF THE INVENTION

These and other objects of the present invention are met by providing a dwelling furnace having at least one clam-shell type primary heat exchanger in side-by-side orientation with a secondary heat exchanger, both the primary and secondary heat exchangers being vertically oriented relative to the furnace housing and parallel to the flow of air to be heated. The primary heat exchanger has a combustion chamber in the lower end thereof, and the lower end of the secondary heat exchanger exhausts into a tertiary heat exchanger oriented approximately perpendicular to the primary and secondary heat exchangers and horizontally relative to the housing, below the combustion chambers of the primary heat exchangers and below the exhaust outlet of the secondary heat exchanger. The tertiary heat exchanger includes a plurality of condensation tubes for retrieving the latent heat of condensation of the combustion gases. The furnace further comprises an induced draft blower for drawing combustion gases through the heat exchangers and inducting sufficient air to the combustion chamber of the primary heat exchanger for efficient combustion.

DETAILED DESCRIPTION OF THE INVENTION

Figure 3:
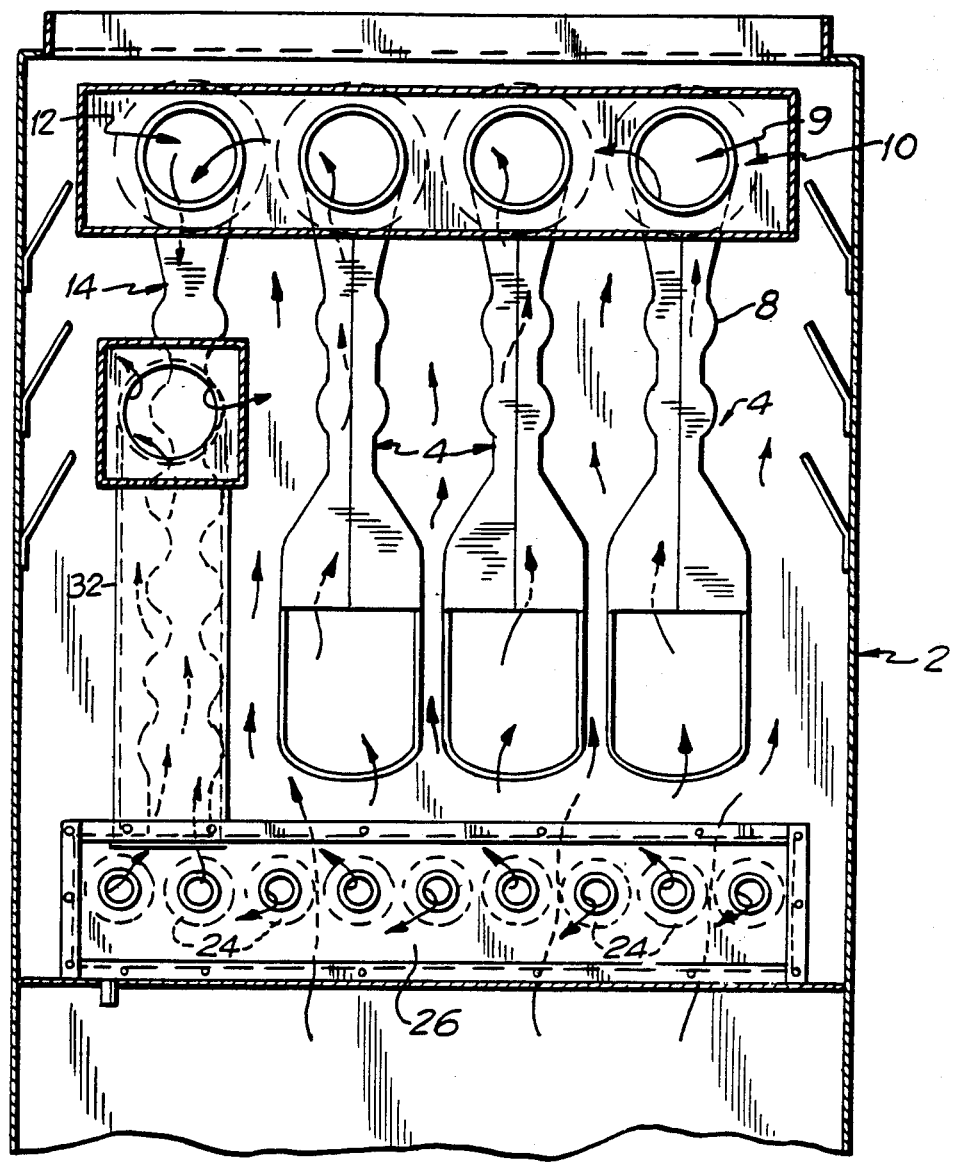
FIG. 3 is a front sectional view taken through FIG. 2 showing all three heat exchangers and the flow of combustion gases therethrough.
Figure 4:
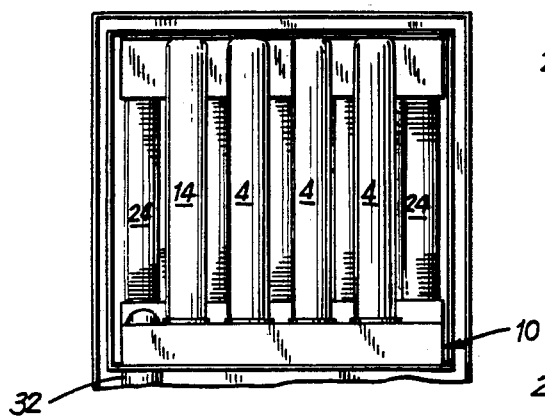
FIG. 4 is a top view of the heat exchanger system of FIG. 3.
Figure 5:
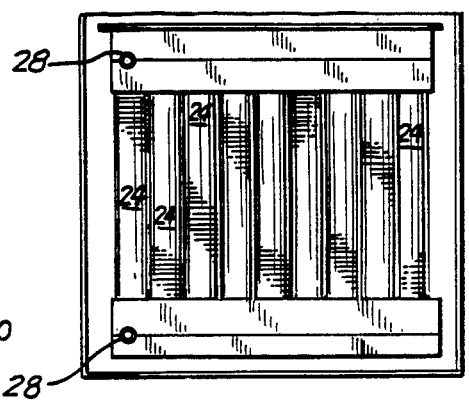
FIG. 5 is a bottom view of the heat exchanger system of FIG. 3.

Referring now to the drawings and in particular to FIG. 3, there is shown a vertical cross section of the heat exchanger system of the present invention. Enclosed within housing 2 are a plurality of primary heat exchangers 4. Fluid fuel and air are introduced at combustion chamber 6 where ignition occurs and chemical energy of the fuel is released through combustion. The combustion gases produced in the combustion chamber 6 along with the heat produced rise through the primary heat exchanger 4. Heat is exchanged to the outside of the primary heat exchanger and into the circulating dwelling air through conduction, radiation and convection with the aid of corrugations 8 which serve to hinder the flow of gases and provide a greater residence time and additionally provide a large surface area for conduction of heat.

In the preferred embodiment of the present invention the primary heat exchangers are of the clam-shell type, having corrugated outer walls to create turbulent air flow and increased surface area for efficient heat transfer.

Figure 1:
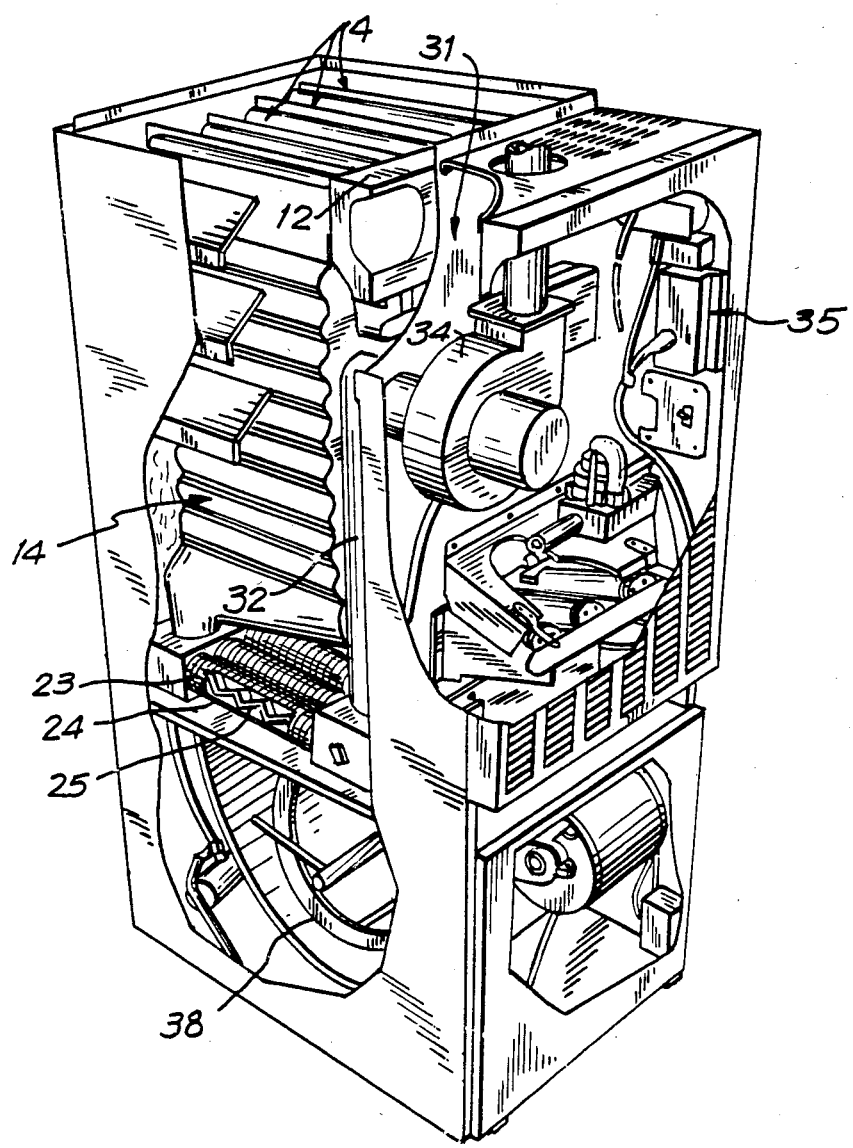
FIG. 1 is a sectional elevational view of a dwelling furnace incorporating the heat exchanger system of the present invention.
Figure 2:
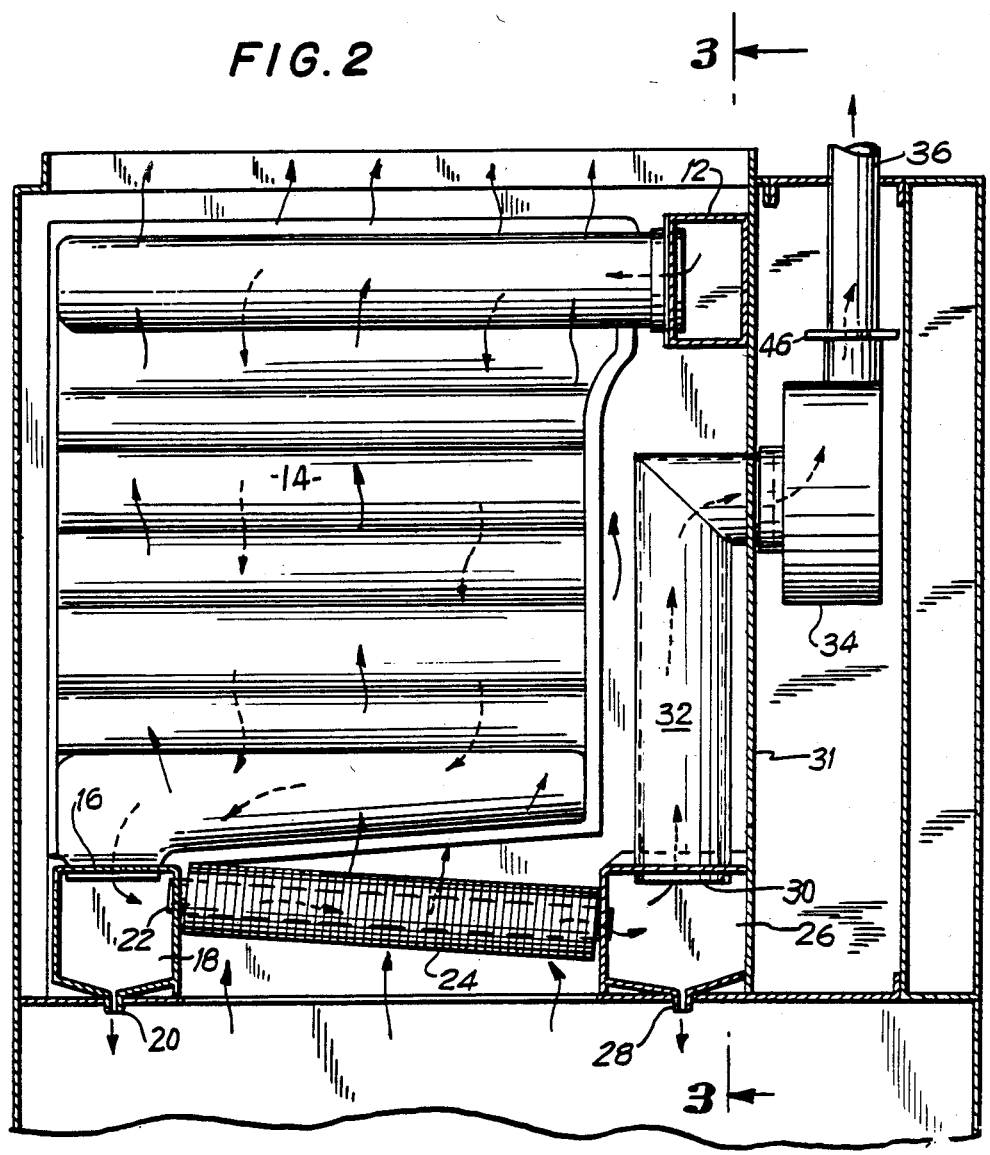
FIG. 2 is a side sectional view of the heat exchanger system showing the flow of combustion gases through the secondary and tertiary heat exchangers.

Referring to FIG. 2 which shows a side section of FIG. 3, and to FIG. 3, the flow of gases and heat from the horizontally oriented manifold 10 into secondary heat exchanger 14 is shown. Upon reaching the upper portion of primary heat exchanger 4, the combustion gases and remaining heat are released through exhaust opening 9 into a horizontally oriented primary exhaust collection manifold 10. The combustion gases and heat exhausted from the primary heat exchanger then enter inlet 12 of secondary heat exchanger 14. In secondary heat exchanger 14, combustion gases and heat flow downwardly through a constrictive system of baffles 13.

In one embodiment of the present invention the design of the secondary heat exchanger is similar to the clam shell design of the primary heat exchanger but has corrugated sides both on the inner and outer surfaces resulting in a more constricted flow of combustion gases, a turbulent air flow and increased surface area for heat transfer.

Upon reaching the lower portion of secondary heat exchanger 14, combustion gases flow through exhaust outlet 16 and into the first condensation collection manifold 18 of tertiary heat exchanger 23. Condensation which has occurred in the secondary heat exchanger eventually enters manifold 18 through exhaust 16. Manifold 18 has a drain port 20 located so that any condensation of combustion gases that collects in the manifold is drained from the heat exchanger system. Manifold 18 also converts the flow of gases from single path to multipath by providing a plurality of inlets 22 to condensation tubes 24. Remaining gases and heat introduced to tubes 24 flow through the tubes 24 which are inclined slightly downwardly so that condensation occurring within the tubes drains into second condensation collection manifold 26 by force of gravity and by the forces created by the induced draft. Condensation collection tubes 24 contain an internal baffle 25 and external cooling fins 27 to efficiently condense combustion gases to the liquid state. Condensate drained into second condensation collection manifold 26 is drained from the heat exchanger system through drain port 28. Remaining combustion gases and heat exit second condensation collection manifold 26 through exhaust outlet 30 into exhaust duct 32. Condensation produced within duct 32 drips back into second manifold 26 for removal through drain port 28.

The condensate obtained from the combustion gases produced in the furnace are highly acidic, and thus, corrosive to most metals. The materials used in the construction of the secondary and tertiary heat exchangers, where condensate is most likely to form, must be corrosion resistant. Suitable materials must also withstand relatively high temperatures i.e., approximately 400°-500° F., and include stainless steel and other suitable alloys, plastics and ceramics.

The benefits of the invention may be attained in some cases by replacing the relatively complicated corrugated secondary heat exchanger with a simple conduit, such as a duct or pipe. Use of a simple pipe or pipes has the benefit of ease of manufacture and installation as well as greatly reduced manufacturing cost. A pipe inlet receives the combustion gases from primary exhaust collection manifold 10. The pipe then transfers the combustion gases to the tertiary heat exchanger through an exhaust outlet.

The combustion gases and remaining heat are then exhausted from the heat exchanger system and the furnace to the atmosphere by means of electric fan 34 which exhausts gases and heat into flue 36. Insulation wall 31 is provided between the heat exchanger system and the furnace control area 35. Insulation wall 31 is intended to reduce the temperature of the furnace control area 35. Further, insulation wall 31 isolates electric fan housing 34 and flue 36 from the flow of dwelling air being heated by the heat exchanger system. The isolation of the electric fan housing and flue tends to reduce condensation occurring past the point where exhaust duct 32 enters electric fan housing 34 as well as reduce radiant heat emanating from the heat exchangers and heated dwelling air contacting the furnace control area. The wall also tends to direct the flow of dwelling air past the heat exchanger.

The relative orientation of the three heat exchangers of the present invention is an important aspect of the invention. The heat exchanger configuration allows both high efficiency and use of a conventional furnace housing. Therefore, the invention can be incorporated in an orthodox furnace design without major changes in the manufacturing process.

In addition, the heat exchanger configuration of the present invention allows the use of clam-shell type primary and secondary heat exchanger which are easier and less expensive to manufacture than, e.g. the drum type heat exchangers of Schauss, et al.

It is particularly important that the tertiary heat exchanger be placed in the area of greatest temperature differential in order to effect condensation and optimal heat transfer. Therefore, the tertiary heat exchanger must be placed below the primary and secondary heat exchangers so that the unheated dwelling air contacts the tertiary heat exchanger before being significantly heated by the primary and second heat exchangers. To cause condensation within the tertiary heat exchanger and thereby capture the latent heat of condensation contained in the combustion gases, the temperature of the dwelling air contacting the tertiary heat exchanger must be below the dew point of the combustion gases, usually approximately 120°-130° F.

Standards, codes and regulations have been promulgated by various regulatory agencies with regard to dwelling furnaces with the intent of increasing the health, safety and welfare of the public. As a result, modern furnaces are required to have numerous controls and safety devices to ensure a safe operation of the furnace. One aspect of the present invention is a safety device incorporated in the first and/or second condensation collection manifold 18 and 26, respectively. The device is intended to serve a dual purpose: detection of a loss of a negative air pressure; and detection of high condensate levels within the manifold. Monitoring these two conditions with one device eliminates the need for two separate sensing devices.

Figure 6:
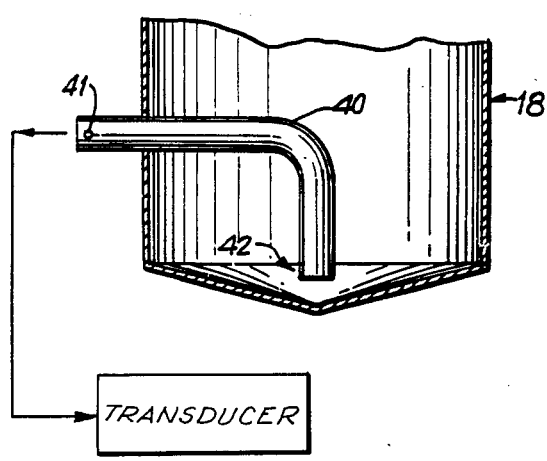
FIG. 6 is a cross-section of the condensation collection manifold showing the dual safety device.

Referring to FIG. 6, a cross-section of condensation collection manifold 18 is shown with sensing device 40 extending through the wall of manifold 18. Sensing device 40 comprises a hollow tube having a lower end 42 positioned at the point where the highest tolerated levels of condensate is to be detected. The other end of tube 40 is in fluid communication with a transducer comprising a pressure switch for detecting changes in pressure within tube 40. At a point along tube 40 located outside of manifold 18 and away from any flow of gases and/or dwelling air, a small vent 41 communicates the interior of tube 40 with the atmosphere.

In normal furnace operation, the induced draft required to initiate operation of the furnace is detected by the dual sensing device when negative pressure is created by air flow passing over the opening of tube 40 located within manifold 18 at lower end 42. Through the Venturi effect, the flow of air passing over the opening creates negative pressure within the tube which is detected by the pressure switch which in turn allows operation of the furnace. In the event air flow ceases, negative pressure within tube 40 is reduced to relative zero and the pressure switch terminates the flow of fuel into the furnace.

In the case of condensate backup caused by a blockage at drain port 28 or elsewhere in the drain system, opening 42 will be sealed by the rising level of condensate isolating the system. Sealing opening 42 alone would not create a change in pressure necessary to activate pressure switch 43. Therefore, small vent 41 is required. When device 40 is isolated at opening 42, the negative pressure within tube 40 is raised (towards zero) by air entering the tube at small vent 41. The increased pressure within tube 40 activates pressure switch 43 which then causes the flow of fuel to the burners to be stopped. Small vent 41 is small enough that the equalization effect it has on negative pressure within tube 40 during normal operation is not significant.

Figure 7:
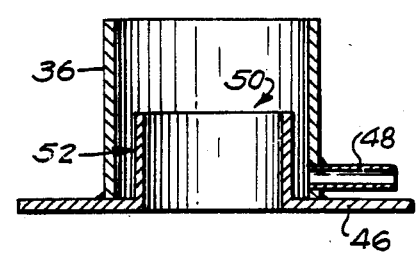
FIG. 7 is a cross-section of the flue condensation collection drain located above the induced draft blower outlet.

Another aspect of the present invention is effecting removal of condensate from flue 36. After combustion gases have passed through electric fan housing 34 and into flue 36, the temperature of the gases is approximately 100° F. It is possible that further condensation can occur at this point. To prevent condensate formed on the inside surfaces of flue 36 from trickling down into electric fan housing 34, a drain is provided at electric fan outlet flange 46. Referring to FIG. 7, outlet 50 of electric fan housing at flange 46 has an outside diameter smaller than the inside diameter of flue 36. Flue 36 is fitted concentrically about flange 46 and over outlet 50. Condensate trickling down inside the surfaces of flue 36 is prevented from entering fan housing 34 by flange 46. Condensate is removed from the channel created by outlet 50 and flue 36 by drain 48.

Another aspect of the present invention is the incorporation of a flame roll-out switch into the safety control features of the furnace. A capillary tube is positioned above the air/gas inlet of the combustion chambers 6 of the primary heat exchangers. In the event the induced draft is terminated, it is possible that flames will back up or "roll out" of the combustion chamber into the furnace control area creating a dangerous situation. Consequently it is essential that in the event of induced draft termination the flow of fuel to the combustion chambers be effected. If the flames "roll out", the heat will contact the capillary tube, causing a change in pressure within the tube which is transduced to an electrical signal via a pressure switch. The electrical signal is used to cause the flow of fuel to the combustion chambers to be stopped.

What is claimed is:

1. In a furnace having
   an exterior housing including means for introducing air to be heated and means for discharging heated air from the furnace;
   at least on primary heat exchanger having a combustion chamber for the ignition of fluid fuel yielding hot combustion gases;
   a condensing heat exchanger in fluid communication with said primary heat exchanger for receiving combustion gases and condensate, and having drainage means for pooling and removing condensate;
   exhaust means communicating with the condensing heat exchanger for removing combustion gases from the housing; and
   an induced draft blower for (a) drawing combustion gases through the heat exchangers, (b) inducting sufficient air to the combustion chamber of the primary heat exchanger for efficient combustion, and (c) forcing the combustion gases through the exhaust means;
   the improvement comprising:
   a dual sensing device for detecting either a change in combustion gas flow rate and/or a predetermined condensate level within the drainage means of the condensing heat exchanger, said dual sensing device comprising a hollow tube configured within the furnace housing to extend from an electrical pressure switch, capable of transducing a change in fluid pressure into an electrical signal, to the region within the condensing heat exchanger where the condensate is pooled and drained from the heat exchanger, said tube having an open sensing end oriented at the predetermined point where the condensate level is to be detected within the condensing heat exchanger so that condensate reaching the predetermined point will seal said open sensing end, a transmitting end for transmitting any fluid pressure change detected by the sensing end to the electrical pressure switch, and a vent communicating the interior of the tube with the exterior of the tube.

* * * * *